United States Patent [19]

Dannoux et al.

[11] Patent Number: 5,526,452
[45] Date of Patent: Jun. 11, 1996

[54] PLANAR OPTICAL WAVEGUIDES WITH LOW BACK REFLECTION PIGTAILING

[75] Inventors: Thierry L. A. Dannoux, Avon; Eric J. H. Firtion, Champagne-sur-Seine; Patrick J. P. Herve, Avon; Fabrice J. G. Jean, Fontainebleau, all of France

[73] Assignee: Corning Incorporated, Corning, N.Y.

[21] Appl. No.: 327,232

[22] Filed: Oct. 21, 1994

[30] Foreign Application Priority Data

Nov. 8, 1993 [EP] European Pat. Off. ............ 93118052

[51] Int. Cl.⁶ .............................. G02B 6/26; G02B 6/42
[52] U.S. Cl. .................... 385/39; 385/49; 385/50
[58] Field of Search ............................ 385/39, 49, 50, 385/38

[56] References Cited

U.S. PATENT DOCUMENTS

| | | | |
|---|---|---|---|
| 4,428,165 | 1/1984 | Dholakia | 51/283 |
| 4,671,609 | 6/1987 | Khoe et al. | 350/96.18 |
| 4,695,126 | 9/1987 | Cook | 350/96.21 |
| 4,725,115 | 2/1988 | Beasley | 385/39 |
| 4,726,641 | 2/1988 | Mori | 385/39 |
| 4,793,679 | 12/1988 | Toda et al. | 385/39 |
| 4,805,976 | 2/1989 | Wilkening et al. | 350/96.2 |
| 4,818,263 | 4/1989 | Mitch | 65/2 |
| 4,836,645 | 6/1989 | Lefevre et al. | 350/96.17 |
| 4,871,226 | 10/1989 | Courtney et al. | 350/96.17 |
| 4,893,889 | 1/1990 | Iwakiri et al. | 385/39 |
| 4,948,219 | 8/1990 | Seino et al. | 350/96.20 |
| 4,953,936 | 9/1990 | Regener et al. | 350/96.17 |
| 4,978,193 | 12/1990 | Tomita | 350/96.21 |
| 4,979,972 | 12/1990 | Berkey et al. | 65/4.2 |
| 4,981,335 | 1/1991 | Gaebe | 350/96.18 |
| 4,986,627 | 1/1991 | Boscher et al. | 350/96.21 |
| 4,991,929 | 2/1991 | Bowen et al. | 350/96.21 |
| 5,022,733 | 6/1991 | Angenent et al. | 350/96.18 |
| 5,028,110 | 7/1991 | Plummer | 385/39 |
| 5,037,171 | 8/1991 | Lund et al. | 385/38 |
| 5,062,682 | 11/1991 | Marazzi | 385/85 |
| 5,107,535 | 4/1992 | Hakogi | 385/49 |
| 5,185,835 | 2/1993 | Vial et al. | 385/49 |
| 5,231,683 | 7/1993 | Hockaday et al. | 385/49 |
| 5,287,424 | 2/1994 | Sheem et al. | 385/39 |
| 5,357,103 | 10/1994 | Sasaki | 385/31 |

FOREIGN PATENT DOCUMENTS

| | | |
|---|---|---|
| 0283301 | 3/1988 | European Pat. Off. . |
| 0527604 | 8/1992 | European Pat. Off. . |
| 2608785 | 12/1986 | France . |
| 62-262021 | 11/1987 | Japan . |
| 1-277204 | 11/1989 | Japan . |
| 2263178 | 7/1993 | United Kingdom . |

OTHER PUBLICATIONS

Ginlett et al, "Degradation in Gbit/s DFB Laser Transmission Systems Due to Phase–To–Intensity Noise Conversion By Multiple Reflection Points", Electronics Letters, vol. 24, No. 7, pp. 406–408; 1988/Jan.

"Bevelled–Microlensed Taper Connectors For Laser And Fibre Coupling With Minimal Back–Reflections", Electronics Letters, vol. 24, No. 18, Sep. 1, 1988, pp. 1162–1163.

NASA Tech Notes, Springfield, "Roof Polishing of Optical Fibers", Nov. 1985, PB85–925711 (N.T.I.S.).

"Analyzing Insertion Loss of Angled Fiber Connectors", Darrin P. Clement and Ulf Osterberg, Fiberoptics Product News, Sep./1983, pp. 25–27.

"Low–Reflectivity In–Line Variable Attenuator Utilizing Optical Fiber Tapers", A. Benner, H. M. Presby and N. Amitay, Journal of Lightwave Technology, vol. 8, No. 1, Jan. 1990, pp. 7–10.

Primary Examiner—Rodney B. Bovernick
Assistant Examiner—Robert E. Wise
Attorney, Agent, or Firm—Gunnar Leinberg

[57] ABSTRACT

An optical waveguide component, with a pigtail attached thereto, is disclosed in which a portion of a surface of the component is bevelled and a portion of the endface of the pigtail is bevelled. The bevelled portion of the pigtail endface is oriented to be substantially parallel to the bevelled portion of the component surface or is oriented to be open with respect to the component surface. The pigtail endface can be continuously bevelled to form a substantially conical shape on the pigtail endface, wherein the substantially conical shape is offset from the optical axis of the pigtail.

16 Claims, 4 Drawing Sheets

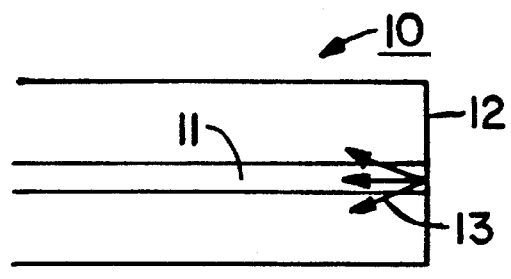
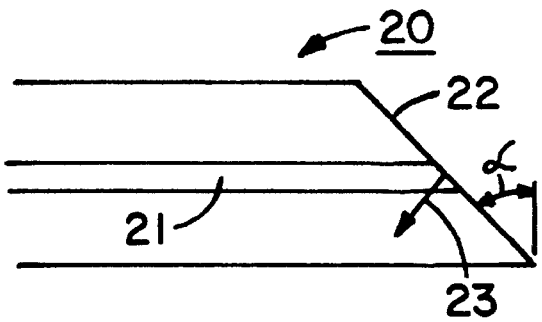
Fig. 1a         Fig. 1b
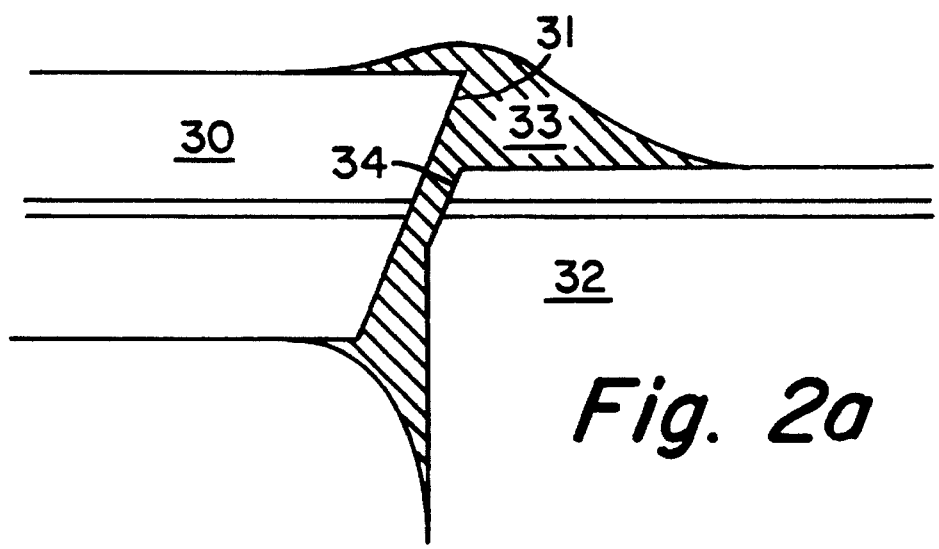
Fig. 2a
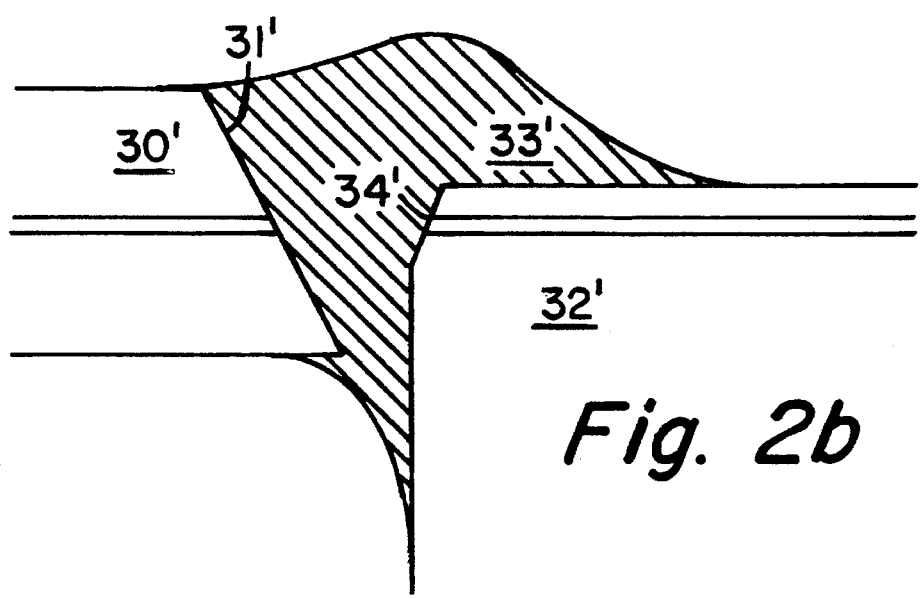
Fig. 2b

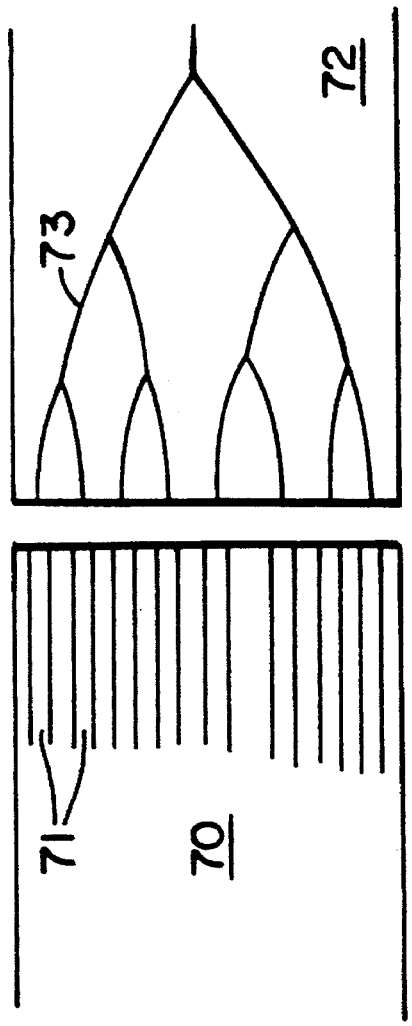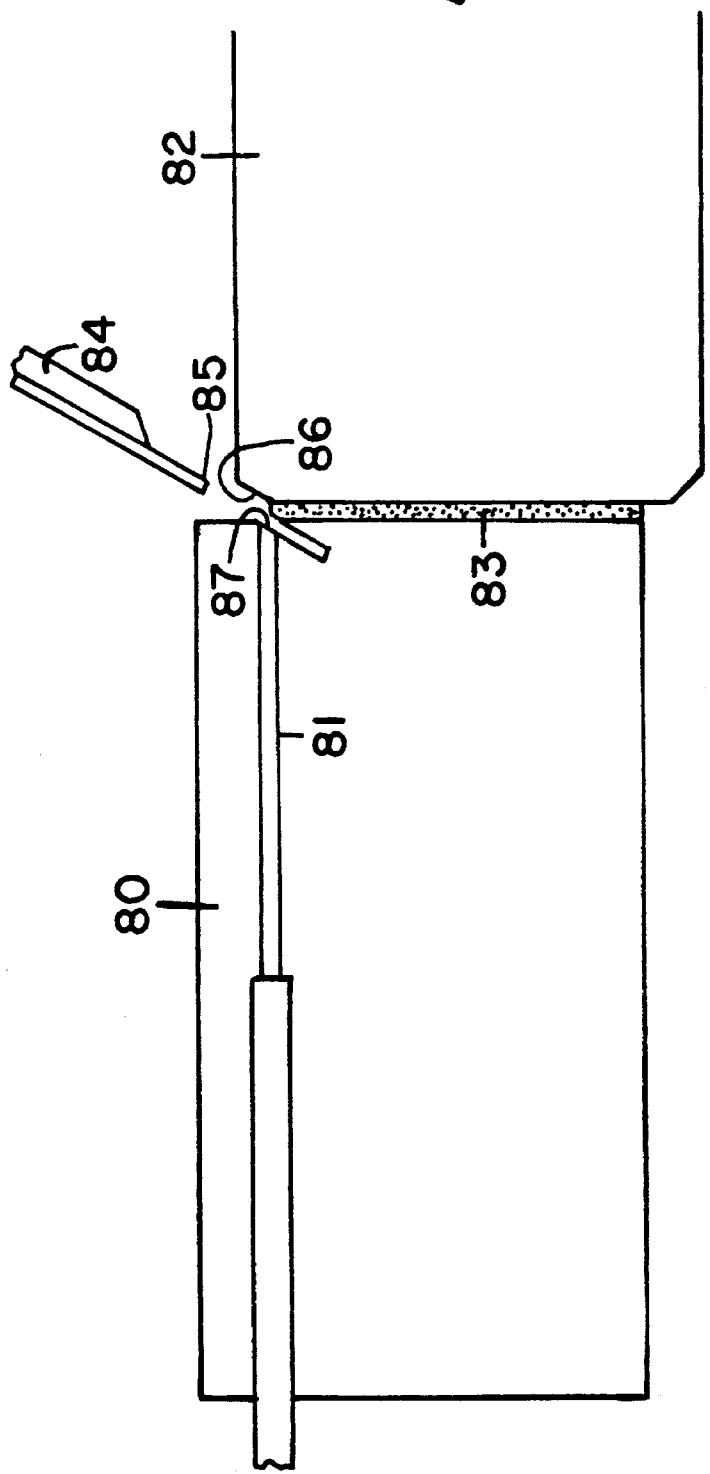

PLANAR OPTICAL WAVEGUIDES WITH LOW BACK REFLECTION PIGTAILING

This invention relates to a connection between an optical fiber pigtail and a planar optical waveguide which has improved back reflection performance.

BACKGROUND OF THE INVENTION

Planar optical waveguides are gaining increasing acceptance for various applications. In the manufacture of planar optical waveguides, a length of optical fiber, commonly referred to as a "pigtail", is attached to the planar optical waveguide. The pigtail is used during installation of the planar optical waveguide to connect the planar optical waveguide to other components, for example other planar optical waveguides, optical fiber, transmitters or receivers, in a system. Pigtails may be attached to components individually or in blocks containing a plurality of pigtails.

The performance of system components can be degraded by optical reflections at connections, including the connection between the pigtail and the planar optical waveguide. The back reflection from the connection between the pigtail and the planar optical waveguide can result in optical power feedback to components such as lasers and other optical power sources. Although the acceptable level of back reflection depends on the protocols used and the network structure, system designers routinely specify back reflection performance of less than −50 dB for individual components. To reduce the level of back reflection, it is desirable to have a low reflectance connection between the pigtail and the planar optical waveguide.

One method used to reduce the back reflection level is to include optical isolators in the system. However, optical isolators increase optical loss, cost and complexity of the overall system. In addition, optical isolators may introduce wavelength and polarization sensitivities into the system. Also, some recent experiments have shown that, even with the use of optical isolators, severe system degradation can occur in Gbit/second systems due to multiple reflections from connectors. Gimlett et al., "Degradation in Gbit/s DFB Laser Transmission Systems Due to Phase-to-Intensity Noise Conversion by Multiple Reflection Points", Electronics Letters, vol. 24, no. 7, pp. 406–408, 1988.

Bevelling the endface of a fiber is primarily used in fiber-to-fiber connections. A problem with using a bevelled endface of an optical fiber in connecting a pigtail to an optical waveguide component is the subsequent requirement of orientation of the pigtail endface to obtain the best results. One orientation of the pigtail endface is shown in FIG. 2. In particular, without proper orientation, such a connection may be mechanically unstable, especially with respect to certain environmental exposures. This instability is generally caused by movement of the pigtail relative to the component which results from expansion of adhesives or gels used to attach the pigtail to the component, and is affected by the impact of the bevel orientation on adhesive or gel location.

This instability is especially evident in situations where the bevel angle is larger (about 10° or more) and the pigtail endface is parallel to the component endface as shown in FIG. 2. If the endfaces are parallel, the axial motion of the pigtail due to expansion mismatches may force the pigtail endface to move upward such that the optical axis of the pigtail is no longer optically aligned with the optical axis of the component. In addition, the pigtail may be forced upward by a rear adhesive drop (not shown) where the fibers are attached individually. Sufficient adhesive must be present on the upper edge of the pigtail to prevent movement. Limited spacing is allowed between the pigtail core and the component so as to minimize optical losses. Therefore, the bevel orientation affects the instability of the pigtail-to-component connection. For further information regarding the attachment of pigtails to components see, for example, Vial et at. U.S. Pat. No. 5,185,835.

It is also possible to orient a bevelled pigtail endface such that it is in an open configuration with respect to the component, as shown in FIG. 2(b). This open configuration is more stable mechanically, as compared to the parallel configuration of FIG. 2, because of an approximate equilibrium in the volume of adhesive or gel above and below the point at which the pigtail endface is closest to the component and because the translation force is not as great. However, this open configuration increases the pigtail/component coupling loss due to angular beam deviation and is less stable during thermal tests because the index of refraction of the adhesive or gel varies dramatically with temperature, thus increasing losses caused by beam deflection.

SUMMARY OF THE INVENTION

It is an object of this invention to provide a robust connection exhibiting good back reflection performance between an optical waveguide component and an optical fiber pigtail. This connection should be relatively simple to fabricate and will provide good performance even after exposure to environmental conditions.

In order to achieve this and other objects, when the pigtail is attached to the optical waveguide component, at least a portion of the pigtail end face which intersects the optical axis of the pigtail is angled with respect to a plane which is normal to the optical axis of the pigtail, and a portion of the endface of the optical waveguide component which intersects the optical axis of the component is angled with respect to a plane which is normal to the optical axis of the component. These angled portions should be large enough to include the core regions of both the waveguide component and the fiber pigtail, and, in fact, large enough to include the boundaries of the mode field transverse distribution, or the mode field diameter, of both the waveguide component and the fiber pigtail.

In one embodiment of the present invention, the angled portion of the pigtail endface is oriented such that it is substantially parallel to the angled portion of the component endface.

In another embodiment of the present invention, the pigtail endface is continuously bevelled to form a conical shape on the pigtail endface. This conical shape is formed such that the apex or point of the conical shape is not aligned with the optical axis of the pigtail. This "offset cone" forms a conical bevel which may be oriented to be parallel with the bevel on the component endface. Any light reflected back from the apex of the conical shape will be directed away from the core of the pigtail and will, therefore, not be reflected back through the pigtail to affect the system of which the component with the pigtail is a part. The conical shape can also be centered on the optical axis of the pigtail and then the tip of the conical shape is bevelled parallel to the component endface.

In another embodiment of the present invention, the pigtail endface is wedge shaped in which a portion of the pigtail endface which intersects the optical axis of the pigtail is bevelled and oriented parallel to the component endface and the remainder of the pigtail endface is bevelled and open relative to the component endface.

In another embodiment of the present invention, a block containing a plurality of pigtails is attached to a component which contains a plurality of optical waveguide paths.

Additionally, the pigtail (or block) is attached to the component using an optically transmitting material, the refractive index of which substantially matches the refractive index of the component. The optically transmitting material can be an adhesive or a gel. A quantity of this material is applied between the pigtail and the component in line with the optical axes thereof. A second portion of this material may be applied on top of the portion of the pigtail adjacent the connection. This second quantity of material adds to the robustness of the connection during exposure to environmental conditions by restricting or eliminating movement of the pigtail.

BRIEF DESCRIPTION OF THE DRAWINGS

FIG. 1(a) is an illustration of back reflection in a fiber pigtail with a substantially perpendicular endface.

FIG. 1(b) is an illustration of back reflection in a fiber pigtail with a bevelled endface.

FIG. 2(a) shows an embodiment of the present invention in which a pigtail-to-component connection utilizes a pigtail with a bevelled endface and a bevelled surface on a portion of the component such that the bevelled endface and the bevelled surface are substantially parallel to each other.

FIG. 2(b) shows an embodiment of the present invention in which a pigtail-to-component connection utilizes a pigtail with a bevelled endface and a bevelled surface on a portion of the component such that the bevelled endface and the bevelled surface are in an open configuration with respect to each other.

FIG. 6 shows a top view of one embodiment of the present invention in which a block containing a plurality of pigtails is connected to a component with a plurality of waveguide paths.

FIG. 7 shows a method for forming bevelled surfaces on a fiber pigtail and component after the pigtail is attached to the component.

DETAILED DESCRIPTION

Figure 3:
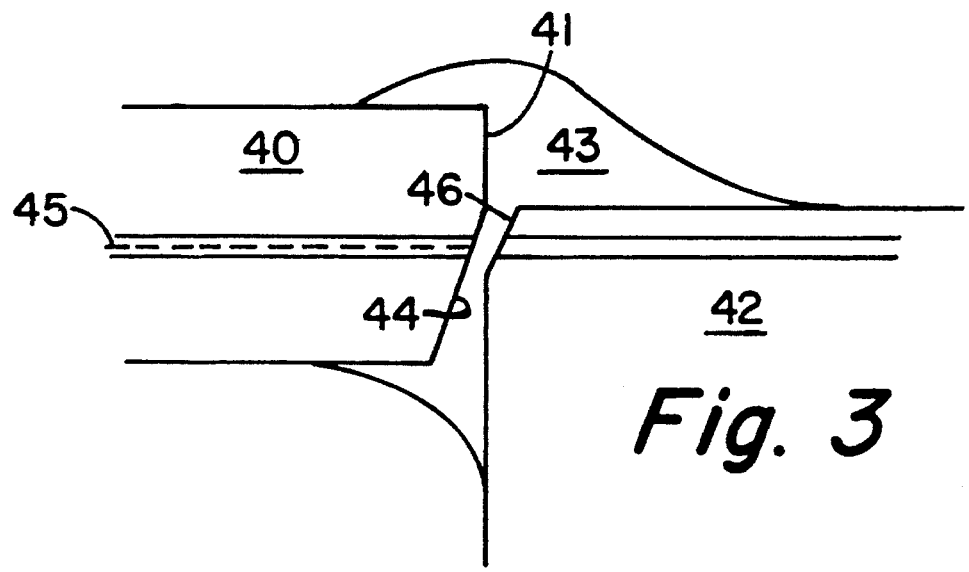
FIG. 3 shows an embodiment of the present invention in which only a portion of the endface of the pigtail is bevelled.

Back reflection from the endface of an optical fiber pigtail is illustrated in FIG. 1(a). As shown in FIG. 1(a), pigtail 10 has a core region 11 and a perpendicular endface 12. If a refractive index mismatch exists at endface 12, Fresnel reflections will occur at endface 12. This is the case when the pigtail is a silica-based pigtail and adjacent endface 12 is either air or some material with a refractive index different from silica or doped-silica. These reflections are indicated by arrows 13. A portion of the Fresnel reflections from endface 12 returns into core region 11 of pigtail 10. This back reflection degrades system performance and may have deleterious effects on components attached to the opposite end of pigtail 10.

FIG. 1(b) shows the effect of a bevelled endface on back reflections. Optical pigtail 20 has a core region 21 and a bevelled endface 22. If a refractive index mismatch is present at endface 22, Fresnel reflection will occur. But because of bevelled endface 22, the back reflection, indicated by arrow 23, will not return into core region 21, but will reflect into the cladding region of pigtail 20. Therefore, system performance will not be degraded by back reflection through core region 21. The angle $\alpha$ should be at least 6° to provide sufficient return loss of the back reflections. However, if the angle is only 6°, it requires a very high degree of polish on the endface surface. Therefore, it is preferred that the angle be about 10° to ensure a sufficiently low reflectance of the endface.

The natural approach to achieving a mechanically more stable connection is to orient the bevel of the pigtail endface in an open configuration, as shown in FIG. 2(b) where pigtail 30' with bevelled endface 31' is attached to component 32' with bevelled surface 34' such that bevelled endface 31' is open, i.e., not parallel, with respect to bevelled surface 34'. Optically transmitting material 33', which can be either an adhesive or a gel, is used to attach pigtail 30' to component 32'. Using this orientation, any axial force which is generated on the pigtail due to thermal expansion effects causes the pigtail to move closer to the component but does not affect the optical alignment of the pigtail with respect to the component unless the axial force continues after the edge of the pigtail has contacted the component endface. However, this orientation is less stable optically, as compared to a parallel orientation as shown in FIG. 2(a), because of the effect of beam deflection, and, therefore, coupling losses, of the temperature dependence of the optically transmitting material's refractive index. This orientation also degrades the pigtail/component coupling at room temperature because of the effect of beam deflection.

While a connection in which the optical gap is made parallel, as illustrated in FIG. 2(a), may result in a less robust and mechanically stable connection, it does provide greater optical stability by minimizing the optical beam deviation or bending which results from the refractive index differences and which will increase the coupling loss. An optical pigtail 30 with a bevelled endface 31 is attached to an optical waveguide component 32 with bevelled surface 34 such that bevelled endface 31 is substantially parallel to bevelled surface 34. Optically transmitting material 33, which can be either an adhesive or a gel, is used to attach pigtail 30 to component 32.

FIG. 3 shows an embodiment of the present invention in which only a portion 44 of endface 41 of pigtail 40 is bevelled. The portion 44 which is bevelled intersects with the optical axis 45 of pigtail 40 and is substantially parallel to the bevelled surface 46 of component 42. Adhesive or gel 43 is used to attach pigtail 40 to component 42. We have found that this partial bevelling of the pigtail endface produces a more mechanically stable connection as compared to a completely bevelled pigtail endface as shown in FIG. 2(a) while maintaining the optical stability benefits of the parallel optical gap. The increased mechanical stability results from the fact that the partially bevelled endface provides significant resistance to axial forces which may be generated by thermal expansion mismatch.

According to the present invention, as shown in the embodiment of FIG. 3, the back reflections from the pigtail endface and the component surface are directed out of the plane which contains the optical paths of the pigtail and the component. This is preferred, particularly in the case of multiple pigtails attached to multiple paths of a component, to avoid the possibility of cross-reflection between the different optical channels. As the density of the channels increases, the possibility of cross-reflection may increase.

To bevel a portion of the pigtail endface, a group of 80 to 100 fibers can be processed simultaneously in a flat ribbon configuration. Optical waveguide fiber is cut to the desired pigtail length, for example, 5 meter lengths. This can be accomplished by using a fiber reel with a 1.6 meter diameter, wrapping optical waveguide fiber around the reel, and cutting the fiber to produce lengths of 5 meters.

The pigtails are then assembled in a holder which arranges the pigtails in a flat ribbon orientation. The upper surface of the holder in contact with the pigtails is coated with a polyurethane film which prevents movement of the pigtails during the bevelling process.

After being placed in the holder, the portion of the pigtails which extend out of the holder are cut to 30 mm lengths. The holder is then placed in a polishing machine for endface flattening, which is accomplished using a rotating polishing disk with a grit size of 10 to 15 μm which contacts the pigtail endface.

Once the endface is flat and has no scale, the holder is oriented to an angle of 10° relative to the rotating polishing disk. The polishing disk is changed to a grit size of 0.3 μm and a bevel is formed on a portion of the pigtail endfaces. In order to ensure that the bevelled portion of the endfaces is large enough to include the core regions of the pigtails, and in fact, is large enough to include the boundaries of the mode field transverse distribution, or the mode field diameter, of the pigtails, the bevelled portion should cover more than half of the endface, or about 70 to 80 μm for a singlemode fiber pigtail as measured from one edge of the endface. The roughness of the pigtail surface is preferably less than about 1 μm.

After polishing, the pigtails are cleaned with alcohol on the exposed 30 mm. The coating on the end 4.5 mm of the pigtails is removed by chemical stripping. The pigtails are now ready for attachment to the optical waveguide component.

The portion of the component endface is prepared as follows. The component endface is formed by machining the component with a diamond blade with a grit size between 3 and 20 μm. The component is then held in a polishing machine such that the polishing tool makes an angle of about 10° relative to the component endface. The polishing machine operates by making an alternating movement with a frequency of between 10 and 100 Hz. An abrasive paper of various grit sizes is used to prepare the component endface.

The preferred condition of the component endface is an angle of about 10° relative to a plane which is normal to the optical axis of the component. The bevelled portion should extend about 40 μm from the top surface of the component to ensure that the bevelled portion is large enough to include the core region of the component, and in fact, is large enough to include the boundaries of the mode field transverse distribution, or the mode field diameter, of the component. It is preferable that the rugosity, which is a measure of the roughness, of the bevelled portion of the component endface be about 100 nm or less.

To achieve the desired condition of the component endface, the component endface is first polished with a grit size of 9 μm until the bevelled portion of the component endface extends about 35 μm from the top surface of the component. The grit size is then reduced to 0.3 μm, and the polishing continues until the bevelled portion extends to 40 μm from the top surface of the component. The total duration of the polishing cycle is about 4 minutes.

Another method for forming the parallel bevelled portions will be described in relation to FIG. 7. Block 80 contains at least one pigtail 81 and is attached to component 82 by adhesive or gel 83. The optical axes of the pigtail and component (not shown in FIG. 7) are aligned prior to attachment. Cutting blade 84 has a cutting surface 85 which is approximately 22 μm in thickness. Cutting blade 84 is oriented to about 10° relative to a plane which is normal to the optical axes of the pigtail and the component. The cutting blade is then brought into contact with the block-component combination such that a bevelled surfaces 86 and 87 are formed on a portion of both the component 80 and the pigtail 82, respectively. Because these bevelled surfaces are made with the same cutting operation, they are essentially parallel to each other. The cutting operation does not disturb the alignment of the block relative to the component.

Figure 4:
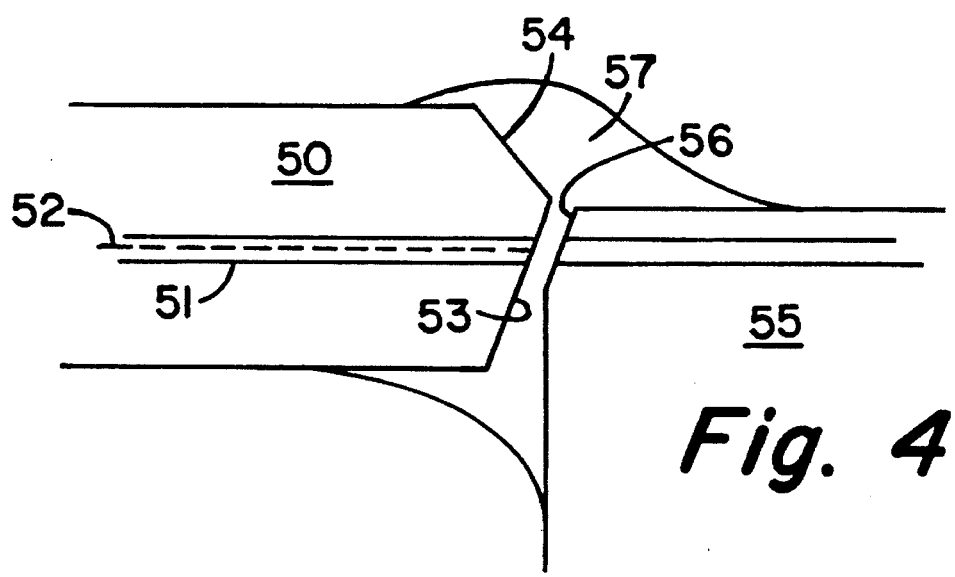
FIG. 4 shows an embodiment of the present invention in which a pigtail-to-component connection has a double bevel on the endface of the pigtail.

The pigtail endface can have a double bevel formed thereon as shown in FIG. 4. As illustrated in FIG. 4, pigtail 50 has a core region 51 which has an optical axis 52. On the end of pigtail 50, first and second bevelled surfaces 53 and 54 are formed. First bevelled surface 53 includes the entire core region 51 of the pigtail, and second bevelled surface 54 does not intersect any portion of the core region 51. Back reflections from bevelled surface 53 are not returned through core region 51 of pigtail 50. Bevelled surface 53 of pigtail 50 is substantially parallel to bevelled surface 56 of component 55. Adhesive or gel 57 is used to attach pigtail 50 to component 55.

Figure 5:
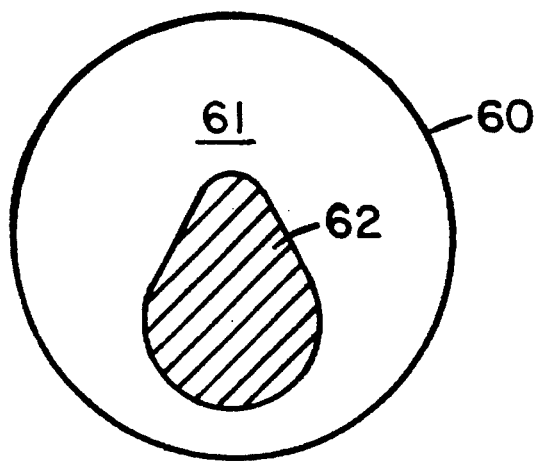
FIG. 5 shows an end on view of an embodiment of the present invention in which a pigtail with a conical shape and in which a portion of the conical shape has been bevelled.

FIG. 5 shows an end-on view of a pigtail 60 which has a conical shape 61 formed on an endface such that conical shape 61 is centered on the optical axis (not shown) of pigtail 60. To prevent back reflections from the apex (not shown) of conical shape 61, a portion 62 of conical shape 61 is bevelled.

A method for forming a microlens on the end of a fiber is disclosed in Mitch U.S. Pat. No. 4,818,263. Through the process disclosed in Mitch, the microlens is precisely centered on the optical axis of the fiber. Mitch states that this precise centering on the optical axis of the fiber provides for dramatic improvement of coupling efficiencies. There is no disclosure or suggestion in Mitch that the microlens may be offset from the optical axis of the fiber. In fact, Mitch even discloses offsetting the microlens from the physical axis of the fiber in the even that the optical axis is offset from the physical axis. If the lens is not centered on the optical axis of the fiber, then the lens function is weakened. Also, there is no disclosure or suggestion in Mitch regarding the impact on back reflection of a microlens formed by the process disclosed therein.

To form a substantially conical shape on a pigtail, the pigtail is rotated and advanced toward a rotating grinding disk. By applying force to the pigtail while it is rotating it and in contact with the disk, the conical shape is formed. The grit size of the abrasive on the disk is advantageously in the range of 1 to 3 μm. The force on pigtail 70 is between 10 and 50 grams. The polishing time is between 2 and 5 seconds.

To form a bevel on a conical shape, as shown in FIG. 5, the conical shape is formed by simultaneously rotating a pigtail and a grinding disk and advancing the pigtail endface toward the disk, then stopping the rotation of the pigtail while continuing to advance the pigtail endface toward the disk to form the bevelled portion.

Figure 8:
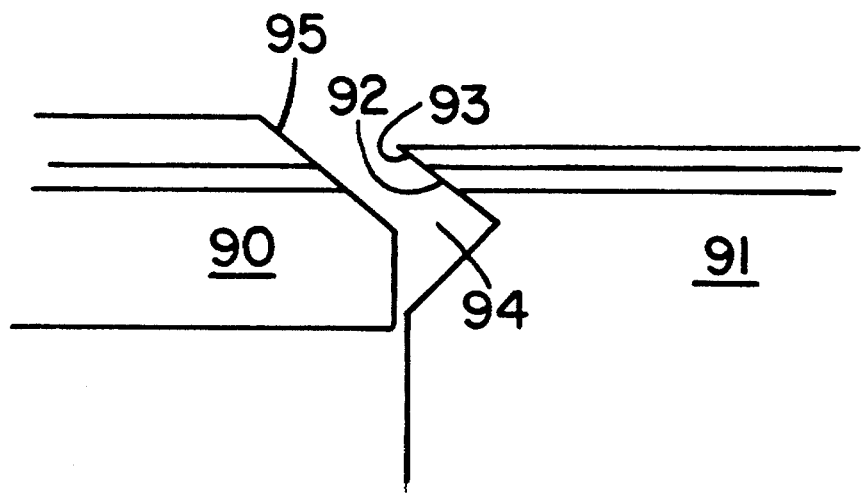
FIG. 8 shows one embodiment of the present invention in which the bevelled surface of the component is formed by notching the endface of the component.
Figure 9:
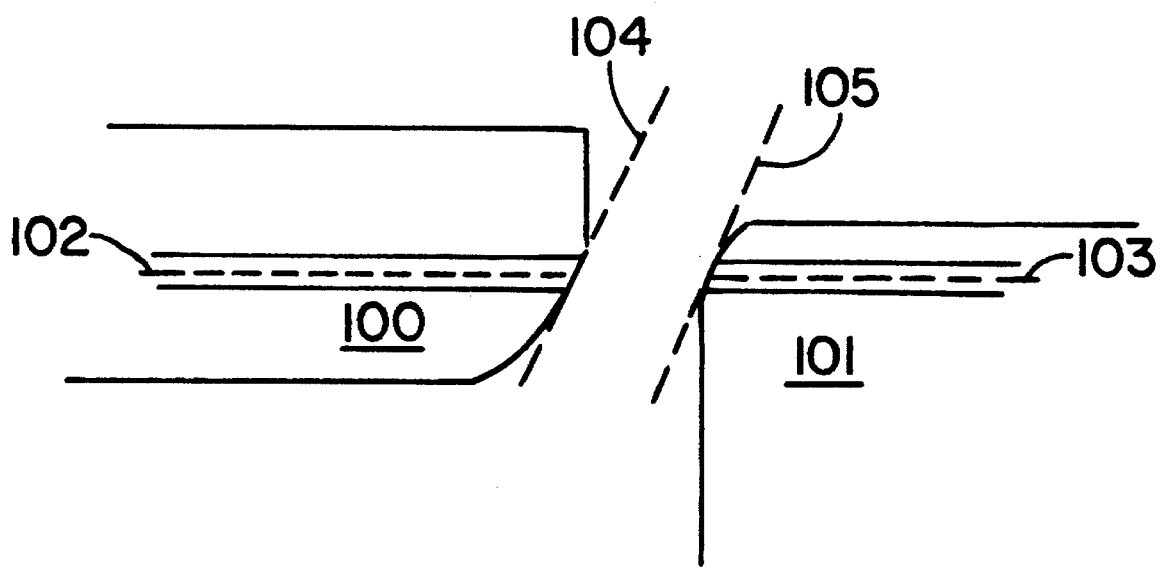
FIG. 9 shows an embodiment of the present invention in which the bevelled endface of the pigtail and the bevelled surface of the component are curved.

Although the examples described herein are relative to individual pigtails, the present invention is equally applicable to configurations in which multiple pigtails are attached to a component in a block or ribbon as shown in FIG. 6. A block 70 containing 8 pigtails 71 is connected to a component 72 containing multiple waveguide paths 73. Also, although the bevelling on the component has been shown as requiring the removal of a portion of the top surface of the component, a bevelled surface 92 can be formed on the component 91 by cutting a notch 94 into the endface of the component, as shown in FIG. 8. Bevelled endface 95 on pigtail 90 is formed and is substantially parallel to bevelled surface 92 of component 91. However, these embodiment is not preferred because of the possibility of chipping occurring at the sharp edge 93, which is at or near the optical axis of the component. Also, the examples herein have shown the bevelled endfaces and surfaces as substantially planar. However, the bevels may be curved as shown in FIG. 9, provided that the local tangents 104 and 105 at the optical axes 102 and 103 of the pigtail 100 and component 101, respectively, are substantially parallel to each other.

The present invention has been particularly shown and described with reference to the preferred embodiments thereof, however, it will be understood by those skilled in the art that various changes may be made in the form and details of these embodiments without departing from the true spirit and scope of the invention as defined by the following claims.

We claim:

1. An optical waveguide component with at least one optical fiber pigtail attached thereto, said pigtail having a first optical axis and said component having a second optical axis, wherein
   a. at least a portion of an end face of said pigtail is bevelled, said portion of said endface intersecting said first optical axis,
   b. at least a portion of a surface of said component is bevelled, said portion of said surface intersecting said second optical axis, and
   c. an index matching material between said portion of said pigtail and said portion of said component,
wherein said pigtail is attached to said component such that said first optical axis is substantially aligned with said second optical axis, and said pigtail is oriented such that said portion of said endface is substantially parallel to said portion of said surface.

2. The component of claim 1, wherein only a portion of said endface of said pigtail is bevelled and only a portion of said surface of said component is bevelled.

3. The component of claim 1, wherein said endface is substantially continuously bevelled to form a conical shape on said endface, said conical shape being offset from said first optical axis.

4. The component of claim 3, wherein a portion of said conical shape on said endface is bevelled.

5. The component of claim 1, wherein
   a. a first portion of said endface of said pigtail is bevelled, said first portion intersecting said first optical axis, and
   b. a second portion of said endface of said pigtail is bevelled
wherein said first portion is oriented parallel to said surface of said component and said second portion is oriented in an open configuration relative to said surface of said component.

6. The component of claim 1, wherein said pigtail is attached to said component by an adhesive.

7. The component of claim 1, wherein an index matching gel is inserted between said portion of said pigtail and said surface of said component.

8. The component of claim 1, wherein a plurality of pigtails, each of said plurality of pigtails having an optical axis, are attached to a plurality of optical paths, each of said plurality of optical paths having an optical axis, in said component.

9. The component of claim 8, wherein said plurality of pigtails are combined in a block or ribbon configuration.

10. The component of claim 8, wherein a back reflection from said surface of said component is directed away from a plane which includes the optical axes of said plurality of pigtails and the optical axes of said plurality of optical paths.

11. A method for manufacturing an optical waveguide component having a first optical axis with at least one optical fiber pigtail attached thereto, said pigtail having a second optical axis, comprising
   a. bevelling a portion of said component to form a bevelled surface, said bevelled surface intersecting said first optical axis,
   b. bevelling a first end of said pigtail to form a bevelled endface, said bevelled endface intersecting said second optical axis, and
   c. attaching said pigtail to said component such that said first optical axis is substantially aligned with said second optical axis and said bevelled surface is substantially parallel with said bevelled endface.

12. The method of claim 11, wherein said step of bevelling a first end of said pigtail further comprises continuously bevelling said first end to form a substantially conical shape on said first end of said pigtail.

13. The method of claim 12, wherein said step of continuously bevelling said first end further comprises polishing said first end of said pigtail on a rotating abrasive tool while simultaneously rotating said pigtail.

14. The method of claim 13, further comprising the step of bevelling a portion of said conical shape on said first end of said pigtail on a rotating abrasive tool while preventing rotational movement of said pigtail.

15. A method for manufacturing an optical waveguide component having a first optical axis with at least one optical fiber pigtail attached thereto, said pigtail having a second optical axis, comprising
   a. aligning said first and second optical axes,
   b. attaching said pigtail to said component, and
   c. simultaneously bevelling a portion of said component, to form a bevelled surface, and a portion of said pigtail, to form a bevelled end face,
wherein said portion of said component intersects said first optical axis and said portion of said pigtail intersects said second optical axis and said bevelled surface is substantially parallel to said bevelled endface.

16. The method of claim 15, wherein a block or ribbon containing a plurality of optical fiber pigtails is attached to said component.

* * * * *